(12) United States Patent
Cole et al.

(10) Patent No.: US 6,255,657 B1
(45) Date of Patent: Jul. 3, 2001

(54) APPARATUSES AND METHODS FOR DETECTING, IDENTIFYING AND QUANTITATING RADIOACTIVE NUCLEI AND METHODS OF DISTINGUISHING NEUTRON STIMULATION OF A RADIATION PARTICLE DETECTOR FROM GAMMA-RAY STIMULATION OF A DETECTOR

(75) Inventors: Jerald D. Cole; Mark W. Drigert; Edward L. Reber; Rahmat Aryaeinejad, all of Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/145,054

(22) Filed: Sep. 1, 1998

(51) Int. Cl.[7] ................................. G01T 3/06; G01T 1/24
(52) U.S. Cl. ............... 250/367; 250/370.03; 250/370.06; 250/371; 250/390.11; 250/394
(58) Field of Search ............................... 250/367, 370.01, 250/370.03, 370.05, 370.11, 371, 390.01, 390.04, 390.11, 370.06, 394

(56) References Cited

U.S. PATENT DOCUMENTS

| 4,005,292 | * | 1/1977 | Oesterlin et al. | 250/364 |
|---|---|---|---|---|
| 4,090,074 | * | 5/1978 | Watt et al. | 250/273 |
| 4,535,246 | * | 8/1985 | Shani | 250/390 |
| 4,990,785 | * | 2/1991 | Logan | 250/368 |
| 5,378,895 | * | 1/1995 | Cole et al. | 250/390.04 |
| 5,587,585 | * | 12/1996 | Eisen et al. | 250/370.09 |
| 5,744,805 | * | 4/1998 | Raylman et al. | 250/370.01 |
| 5,763,887 | * | 6/1998 | Murphy | 250/366 |
| 5,847,396 | * | 12/1998 | Lingren et al. | 250/396 |
| 5,939,723 | * | 8/1999 | Keck | 250/363.01 |
| 6,011,266 | * | 1/2000 | Bell | 250/390.01 |

OTHER PUBLICATIONS

R. Aryaeinejad et al. *Band Crossing Observed in Neutron–Rich Pd Isotopes via Sponataneous Fission of* $^{252}Cf$, C48 Phys. Rev. 566 (1993).

(List continued on next page.)

*Primary Examiner*—Constantine Hannaher
(74) *Attorney, Agent, or Firm*—Well St John Roberts Gregory & Matkin (57) ABSTRACT

In one aspect, the invention encompasses a method of detecting radioactive decay, comprising: a) providing a sample comprising a radioactive material, the radioactive material generating decay particles; b)providing a plurality of detectors proximate the sample, the detectors comprising a first set and a second set, the first set of the detectors comprising liquid state detectors utilizing liquid scintillation material coupled with photo tubes to generate a first electrical signal in response to decay particles stimulating the liquid scintillation material, the second set of the detectors comprising solid state detectors utilizing a crystalline solid to generate a second electrical signal in response to decay particles stimulating the crystalline solid; c) stimulating at least one of the detectors to generate at least one of the first and second electrical signals, the at least one of the first and second electrical signals being indicative of radioactive decay in the sample. In another aspect, the invention encompasses an apparatus for identifying and quantitating radioactive nuclei of a sample comprising radioactive material that decays to generate neutrons and high-energy $\gamma$-rays.

37 Claims, 4 Drawing Sheets

OTHER PUBLICATIONS

K. Buttler–Moore et al., Levels in $^{136}$Te and New High–Spin States in Neutron–Rich N=84 Isotones, G19 J. Phys. G19 L121 (1993).

G. M. Ter–Akopian et al., Neutron Multiplicities and Yields of Correlated Zr–Ce and Mo–Ba Fragment Pairs in Spontaneous Fission of $^{252}$Cf, 73 Phys. Rev. Lett. 1447 (1994).

J. H. Hamilton et al., Zero Neutron Emission in Spontaneous Fission of $^{252}$Cf: A Form of Cluster Radioactivity, 20 J. Phys. G: Nucl. Part. Phys. L85–L89 (1994).

J. Kliman et al., Correlated Yields and the Emission of Neutrons of Mo/Ba Fragments from $^{252}$Cf, 57 Sov. J. Nucl. Phys. 1008 (1994).

J. H. Hamilton et al., New Insights From Studies of Spontaneous Fission with Large Detector Arrays, 35 Prog. Part. Nucl. Phys. 635–704 (1995).

K. Butler–Moore et al., Evidence of Unique Parity Band Structure in Neutron–Rich Odd–A Ru Isotopes, C52 Phys. Rev. 1339 (1995).

K. Butler–Moore et al., Application of X–rays in Prompt Spectoscopy of $^{252}$Cf Fission Fragments, A361 Nucl. Instr. And Meth. 245–252 (1995).

S. J. Zhu et al., Octupole Deformation in $^{142,143}$Ba and New Band Structure in Neutron–Rich Ba Isotopes, B357 Phys. Lett. 273 (1995).

S. J. Zhu et al., Identification of Levels in $^{160}$Sm and High Spin States in $^{156,158}$Sm Nuclei, 21 J. Phys. G: Nucl. Part. Phys. L57 (1995).

S. J. Zhu et al., Identification of $^{152}$Ce and Unexpected Variations in Moments of Inertia With Neutron Number and Spin in $^{142–148}$Ba, $^{144–152}$Ce, and $^{146–156}$Nd, G21 J. Phys. L75 (1995).

Q. H. Lu et al., Structure of $^{108,110,112}$Ru; Identical Bands in $^{108,110}$Ru, C52 Phys. Rev. 1348 (1995).

J. H. Hamilton et al., Structure of Neutron–Rich Nuclei and Neutron Multiplicities in Spontaneous Fission, 264 Phys. Rep. 215 (1995).

Y. X. Dardene et al., Observation of cold fission in $^{242}$Pu spontaneous fission, 77 Phys. Rev. Lett. 32 (1996).

B. R. S. Babu et al., Identification of γ transitions in $^{147}$Ba, $^{149}$Ce, and $^{151,153}$Nd, C54 Phys. Rev. 568 (1996).

J. H. Hamilton et al., New Cold and Ultra Hot Binary and Cold Ternary Spontaneous Fission Modes for$^{252}$Cf and New Band Structures With Gammasphere, 38 Prog. In Part. And Nucl. Phys. 273 (1997).

G m ter. Akopian et al., New Spontaneous Fission Mode for $^{252}$Cf: Indication of Hyperdeformed $^{144,145,146}$Ba at Scission, 77 Phys. Rev. Lett. 32 (1996).

J. K. Hwang et al., Identification of $^{109}$Mo and possible octupole correlations in $^{107,109}$Mo, C56 Phys. Rev. 1344 (1997).

A V Ramayya et al., Cold (neutronless) a ternary fission of $^{252}$Cf: C57 Phys. Rev. 2370 (1998).

J. K. Hwang et al., Identification of the gamma transitions in Tc and Cs products of $^{252}$Cf Fission and possible 7/2+[413] bands in $^{105–109}$Tc isotopes, C57 Phys. Rev. 2250 (1998).

X Q Zham et al., Identification of new negative–parity levels in $^{152,154}$Nd, C57 Phys. Rev. 2040 (1998).

S J Zhu et al., High spin octupole correlations in the N–85 , $^{139}$X3 and $^{141}$Ba isotones, 23 J. Phys. G: Nucl. Part. Phys. L77–L83 (1997).

R. C. Greenwood et al., Identification of New Neutron–Rich Rare–Earth Isotopes Produced in $^{252}$Cf Spontaneous Fission, Fifth International Conference on Nuclei Far From Stability, Rosseau Lake, Ontario, Canada (Sep. 14–19, 1987) at 786, Ian S. Towner, ed., Am. Inst. Of Phys. (New York 1988).

R. A. Anderl et al., An ISOL Facility for $^{252}$Cf Fission Product Studies, Third Chemical Congress of North America, Toronto, Ontario, Canada (Jun. 5–11, 1988).

R. C. Greenwood et al., Nuclear Structure Studies of Neutron–Rich Nuclides Using a $^{252}$Cf–Based ISOL Facility, Third Chemical Congress Of North America, Toronto, Ontario, Canada (Jun. 5–11, 1988).

R. C. Greenwood et al., Nuclear Data Measurements of Neutron–Rich Nuclides Produced in Fission Using On–Line Isotope Separation, International Conference on Nuclear Data for Science and Technology, Mito, Japan (Jun. 3, 1998).

S. Zhu et al., Higher Spin States in Neutron Rich Nuclei, XV Nuclear Physics Symposium, Oaxtepec, Mexico (Jan., 1992), P. Hess, ed., 38 Rev. Mex. Fis. 53 (1992).

K. Butler–Moore et al., High Spin States in Neutron Rich Nuclei From Spontaneous Fission, at 551, International Conference on Nuclei Far From Stability and Atomic Masses, Bernkastel–Kues, Germany (Jul. 19–24, 1992).

J. H. Hamilton et al., A New Spontaneous Fission mode for $^{252}$Cf: Hyperdeformation, Cluster Radioactivity, New Levels, at 187, XV Nuclear Physics Divisional Conference, St.Petersburg , Russia, (Apr. 18–22, 1995).

J. H. Hamilton et al., Extended Identical Bands in $^{98,100}$Sr and $^{108,110}$Ru and New High Spin States in $^{98–102}$Zr and $^{112–116}$Pd,International Conference on Exotic Nuclei and Atomic Masses, Arles, France (Jun. 19–23, 1995).

S. J. Zhu et al., Identification of $^{152}$Cs, $^{160}$Sm and higher Spin States and Identical Bands in Neutron–Rich Ce, Nd, Sm Isotopes, International Conference on Exotic Nuclei and Atomic Masses Arles, France (Jun. 19–23, 1995).

* cited by examiner

APPARATUSES AND METHODS FOR DETECTING, IDENTIFYING AND QUANTITATING RADIOACTIVE NUCLEI AND METHODS OF DISTINGUISHING NEUTRON STIMULATION OF A RADIATION PARTICLE DETECTOR FROM GAMMA-RAY STIMULATION OF A DETECTOR

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

TECHNICAL FIELD

The invention pertains to methods and apparatuses for detecting, identifying and quantitating radioactive nuclei. Further, the invention pertains to methods of distinguishing neutron stimulation of a radiation particle detector from γ-ray stimulation of the detector.

BACKGROUND OF THE INVENTION

A substantial amount of radioactive waste has been generated over the last several decades. Such waste is generated, for example, as a by-product of nuclear weapons construction and destruction, or as a by-product of nuclear reactor power plants in the form of a spent nuclear fuel. Radioactive waste poses a threat to humans, and the severity of the threat varies as a function of the type and amount of radioactive atoms present in the waste. Accordingly, it is desirable to develop methods for identifying and quantitating radioactive atoms present in a nuclear waste.

Radioactive atoms present in nuclear waste are generally atoms that undergo fission decay processes. In other words, the atoms "split" and thereby convert from one element to another. Decay particles, such as γ-rays, beta-rays, alpha-rays, and neutrons can be generated during the splitting. Numerous decay particles can be generated by a single fission event. For instance, a single fission event for $^{242}$Pu can emit multiple γ-rays and multiple neutrons. The γ-rays travel at the speed of light, and the neutrons travel slower than the speed of light. The neutrons can be so-called "fast neutrons" and so-called "thermal neutrons". The fast neutrons have energy greater than or equal to 40 keV, and the thermal neutrons have energy less than 40 keV (actually, about 0.25 eV).

Detection systems have been developed for detecting decay particles. A common system couples a liquid scintillator solution with a phototube. The liquid scintillator comprises a mixture of volatile hydrocarbons (such as, for example, xylene, naphthalene, and/or anthracene) that have been purged of oxygen and other oxidizing radicals. The liquid scintillator typically has a high ratio of hydrogen to carbon, which can make it particularly effective for detecting neutrons. Specifically, neutrons can scatter off the protons (hydrogen atoms) to thereby transfer energy to the protons. As the protons recoil from such scatter, they can emit light. Such light can then impact the photo tubes to be converted to an electrical signal. Frequently, only a very small amount of light is produced. Accordingly, the photo tubes frequently comprise photomultiplier tubes which are configured to amplify a light signal as well as to convert the light signal to an electrical signal. The liquid scintillator can be varied depending upon whether it is desired to detect thermal neutrons or fast neutrons. Specifically, some liquid scintillators are known to detect fast neutrons much better (i.e, at higher efficiency) than thermal neutrons.

The liquid scintillator/phototube detector can also detect γ-rays. Specifically, γ-rays can interact with atomic electrons of atoms in the liquid scintillator via a so-called Compton scattering process to create light.

Figure 1:
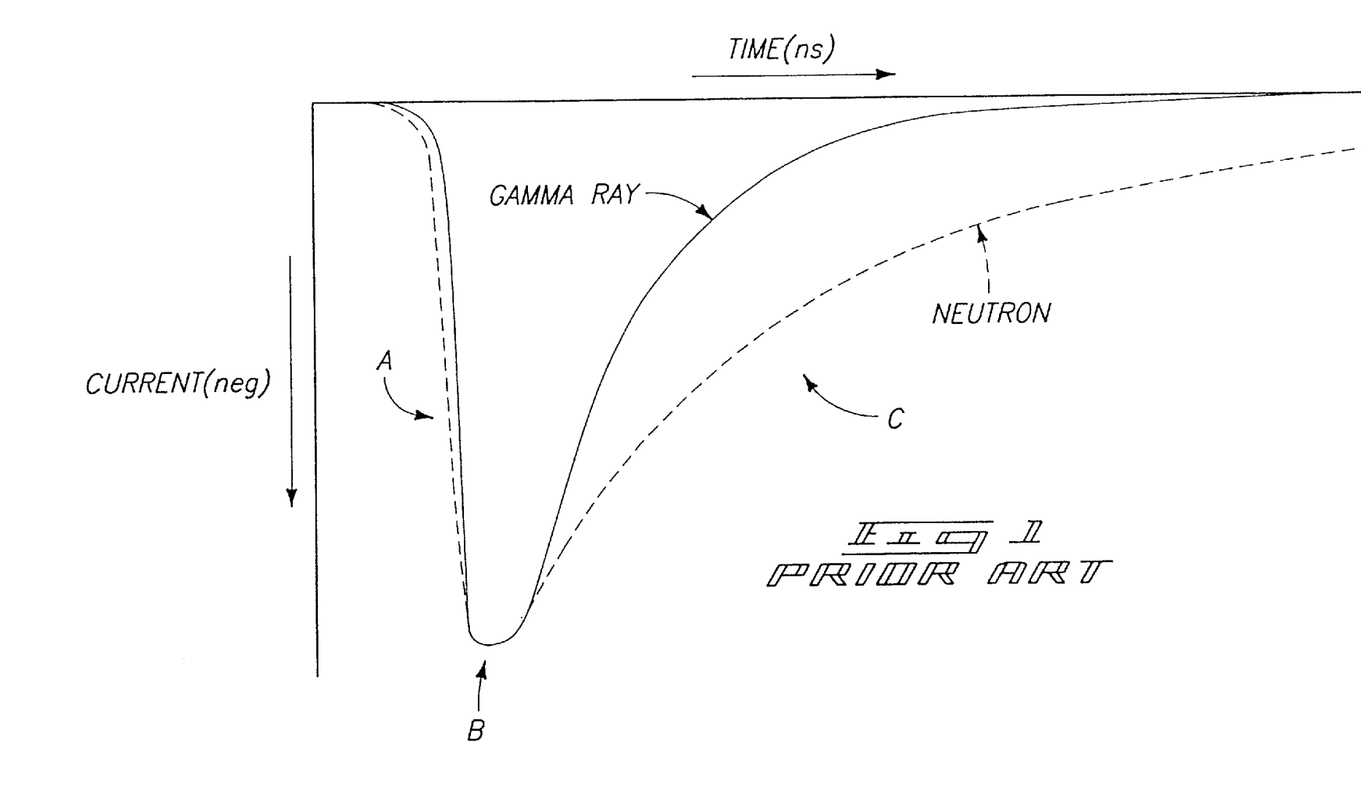
FIG. 1 is a prior art graph of current as a function of time for a γ-ray pulse (solid line) and a neutron pulse (dashed line), wherein the pulses correspond to electrical signals generated by a liquid scintillation/phototube detector.

Exemplary electrical signals produced by a liquid scintillator/phototube detector in response γ-ray and neutron stimulation of the detector are shown in a FIG. 1 graph. A curve corresponding to an electrical signal obtained from a γ-ray is illustrated with a solid line, and a curve corresponding to an electrical signal obtained from a neutron is illustrated with a dashed line. The FIG. 1 graph compares an output current from a phototube to time (as measured in nanoseconds). The magnitude of the pulses and the time duration are not relevant for the present discussion, simply the relative differences in the γ-ray curve versus the neutron curve are important. The pulses develop in time from left to right. Each of the curves has a leftmost (leading edge) region "A" wherein an absolute value of current is increasing, and a rightmost (tailing edge) region "C" wherein an absolute value of current is decreasing. Also, the curves have a peak intensity "B" wherein an absolute value of current is maximized.

The greatest difference between the neutron curve and the γ-ray curve occurs in region "C", and the least difference occurs in region "A". Methods have been developed for utilizing the differences in region "C" for distinguishing neutron curves from γ-ray curves. Such methods typically integrate a curve, such as, for example, either the γ-ray curve or the neutron curve shown in FIG. 1 to determine a total intensity underlying the curve. The methods typically also involve separately integrating the intensity under a region "C" of the curve to obtain a final intensity of the curve. The final intensity is then ratioed to the total intensity to obtain a value. The value is compared to standard values obtained from both γ-ray curves and neutron curves to ascertain if the curve in question was generated by a γ-ray interaction with a detector, or a neutron interaction with a detector. The methods thus effectively comprise comparing a final intensity to a sum of the final intensity plus an initial intensity, wherein the initial intensity is defined as the intensity underlying region "A" of a curve.

Methods of utilizing curve pulse shape for distinguishing signals due to neutron stimulation of a detector from signals due to γ-ray stimulation are generally referred to as Pulse Shape Discrimination (PSD) systems. The γ-ray curve and neutron curve shown in FIG. 1 are idealized. Frequently, the curves are not as readily distinguishable as those shown. The PSD values will accordingly be very close for γ-ray curves and neutron curves, and the difference between γ-ray curves and neutron curves will essentially be represented as a small difference in very large PSD values. It is therefore desirable to develop alternative PSD systems wherein differences between neutron curves and γ-ray curves are enhanced. Another complication in characterizing decay particles generated by nuclear waste is in distinguishing such decay particles from background radiation. It is known that background radiation typically occurs as isolated random events, whereas radiation emitted from a waste material can occur in bursts of multiple particles. The bursts result from multiple particles being generated by single fission events. The multiple particles emitted by a single fission event of a radioactive material are referred to coincidence particles. Coincidence can be used to distinguish background radiation from radiation generated by a radioactive sample. For instance, circuitry can be configured to "turn on" a signal acquisition system in response to a detected coincidence event. Exemplary circuitry utilizes multiple detectors to monitor a sample. The detectors are linked to a pair of processing systems. The first processing system is configured to determine coincidence of signals received from the detectors. Once coincidence is established, the first processing system opens the second processing system. Further detection events are then processed by the second processing system which is configured to store and process electrical pulses obtained from the detectors. The first and second processing systems are opened for predetermined lengths of time. Such predetermined lengths of time can vary depending on the stringency with which background radiation is to be suppressed. Coincidence is typically established by signals occurring within 10 microseconds of one another. Once coincidence is established, the second gate is typically opened for a period of at least about 100 microseconds.

An effectiveness of a coincidence method for suppressing background in a given length of time can be limited by a speed that detectors respond to radiation and the time required by associated circuitry for processing signals received from the detectors. If a detector requires microseconds to convert light to an electrical pulse and then output the pulse to a processor, then the maximum count rate at which the detector is usable is only a few hundred thousand counts per second. For example, a detector that requires ten microseconds to process one count has a maximum count rate of 100,000 counts per second. Currently available systems typically have a count rates on the order of about 200,000 counts per second. Such limits the maximum speed with which a system can acquire information from a radioactive sample. It is desirable to develop faster methods of acquiring information from radioactive samples.

Another problem that can occur in monitoring radiation emitted from radioactive samples is that the samples are frequently encapsulated in materials designed specifically to limit an amount of radiation penetrating the materials. Such materials are provided for safety purposes, to limit a risk of exposure of persons near the radioactive waste to dangerous levels of radiation. Frequently, it is required to destroy the retaining materials prior to analysis of a sample in order to have enough radioactive particles impact detectors proximate the sample to obtain information about the sample. It is desirable to develop alternative methods of obtaining information about radioactive samples which can be performed non-destructively relative to retaining materials encapsulating the samples.

Another problem confronted during monitoring of radiation emitted by radioactive samples is in obtaining information about γ-ray emissions. Specifically, γ-rays do not interact well with liquid scintillating materials. Accordingly, most γ-rays simply penetrate the materials without being detected. Improved detectors have been developed for detecting γ-rays. Such detectors are so-called solid state detectors. The detectors utilize crystals of, for example, germanium to convert energy from γ-rays directly to electronic charges. Typically, the detectors will comprise a single crystal of germanium. Such detectors are highly efficient for detecting γ-rays. A disadvantage of the detectors is that they generally will not detect neutrons. It is desirable to develop detector systems which can efficiently detect both neutrons and γ-rays.

SUMMARY OF THE INVENTION

In one aspect, the invention includes a method of detecting radioactive decay. A sample comprising a radioactive material is provided, and the radioactive material generates decay particles. A plurality of detectors is provided proximate the sample. The detectors comprise a first set and a second set. The first set of detectors comprises liquid state detectors utilizing liquid scintillation material coupled with photo tubes to generate a first electrical signal in response to decay particles stimulating the liquid scintillation material. The second set of the detectors comprises solid state detectors utilizing a crystalline solid to generate a second electrical signal in response to decay particles stimulating the crystalline solid. At least one of the detectors is stimulated to generate at least one of the first and second electrical signals. The at least one of the first and second electrical signals is indicative of radioactive decay in the sample.

In another aspect, the invention includes an apparatus for identifying and quantitating radioactive nuclei of a sample. The sample comprises a radioactive material that decays to generate neutrons and high-energy γ-rays. The apparatus comprises a plurality of detectors configured to be proximate the sample. The detectors comprise a first set and a second set. The first set of the detectors have liquid scintillation material coupled with phototubes that are configured to generate a first electrical signal in response to decay particles stimulating the liquid scintillation material. The second set of the detectors have a crystalline solid and are configured to generate a second electrical signal in response to decay particles stimulating the crystalline solid.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In one aspect, the invention encompasses an apparatus for identifying and quantitating radioactive nuclei of a sample. A preferred apparatus comprises two sets of detectors configured to be proximate the sample. A first set of the detectors comprises liquid scintillation material coupled with phototubes, and a second set of the detectors comprises a crystalline solid, such as a single crystal of germanium. Exemplary liquid scintillation material can be purchased from BICRON, as BL501A. Exemplary phototubes can be purchased from Philips, as XP20202. Exemplary detectors comprising single crystal germanium can be purchased from EG&G ORTEC. The first set of detectors is configured to generate a first electrical signal in response to decay particles stimulating the liquid scintillation material, and the second set of detectors is configured to generate a second electrical signal in response to decay particles stimulating the crystalline solid. As discussed above in the "Background" section of this disclosure, detectors comprising crystalline solids are typically better suited for detecting γ-rays then neutrons, and detectors comprising liquid scintillation material can be utilized for detecting neutrons if suitable Pulse Shaped Discrimination systems are utilized. Preferably, the detectors comprising liquid scintillation material are configured to detect fast neutrons selectively relative to thermal neutrons.

Prior art detection systems utilized either a set of liquid scintillation/phototube detectors, or a set of crystalline solid detectors, but did not combine the two types of detectors into a single system. In accordance with the present invention, it is recognized that there can be advantages to combining scintillation/phototube detectors and crystalline solid detectors in a single apparatus. For instance, it is recognized that γ-rays can be utilized for identifying particular decaying radioisotopes present in a fissile sample, and neutrons can be utilized for quantitating the amounts of radioisotopes present in the sample. Further, it is recognized that quantitation of coincident fast neutrons can be particularly useful for quantitating the amount of fissile material present in the sample.

The present invention encompasses methods wherein a first detected coincident event is utilized to open a window for detecting subsequent detected coincident events. The first detected coincident event can comprise detection of 2 or more fast-traveling emitted particles. The fast-traveling particles can be γ-rays, fast neutrons, or a combination of γ-rays and fast neutrons. Thermal neutrons are not "fast-traveling" particles. Coincidence can be established by, for example, a control system coupled with the crystalline solid detectors and liquid scintillation detectors, and configured to be responsive to a predetermined number of electrical signals being generated from the detectors within a predetermined period of time. A preferred predetermined number of electrical signals is 2. A preferred predetermined period of time is less than about 300 nanoseconds, more preferably less than about 100 nanoseconds, and even more preferably less than or equal to about 10 nanoseconds.

Once the predetermined number of electrical signals are received within the predetermined period of time, the control system can open a gate to selectively pass additional electrical signals from the liquid scintillation material/phototube detectors and crystalline solid to a processing system configured to process the additional electrical signals. Such processing of the additional electrical signals can, for example, comprise Pulse Shape Discrimination of signals received from the liquid scintillation material/phototube detectors to distinguish if such signals are due to neutron or γ-ray impact on the liquid scintillation material.

The processing of the additional electrical signals can further comprise ascertaining the number of neutrons impacting the liquid scintillation material/phototube detectors within a predetermined period of time, and extrapolating such number to estimate an amount of radioactive material comprised by the radioactive sample. Preferably, the processing comprises ascertaining the number of coincident fast neutrons impacting the detectors within a predetermined period of time, and extrapolating such number to estimate an amount of radioactive material comprised by the radioactive sample. Coincident fast neutrons are defined as fast neutrons detected within 300 nanoseconds of one another, preferably is limited to fast neutrons detected with 100 nanoseconds of one another, and even more preferably is limited to fast neutrons detected with 10 nanoseconds of one another. The prior art did not utilize quantitation of coincident fast neutrons as a method of quantitating an amount of fissile material. However, such quantitation can be superior to prior art methods for reducing background noise effects (and hence can have improved accuracy over prior methods). The utilization of fast neutrons for methods of the present invention can be superior to utilization of thermal neutrons in that fast neutrons tend to be less effected by scattering materials than are thermal neutrons. If neutrons are scattered during their flight to a detector, the time of the flight can be altered. This can result in detection of coincident neutrons that were not emitted in a common fission event, as well as in non-coincident detection of neutrons that were emitted in the same fission event.

Quantitation of an amount of fissile material from coincident fast neutron detection events can be accomplished by, for example, comparing the number of fast neutron coincident detection events associated with a sample in a given period of time with the number of fast neutron coincident detection events associated with a standard in the same period of time. The amount of fissile can then be expressed as an "equivalent" to an amount of the standard material (e.g., as equivalent to "x" grams of $^{235}$U).

The processing of electrical signals received from the crystalline solid γ-ray detectors can include quantitation of γ-ray energies. The quantitated γ-ray energies can specifically identify the radioisotopes present in a radioactive sample. Specifically, it is found that "high-energy" γ-rays are emitted from fission processes, and that such high-energy γ-rays can have energies which uniquely identify the particular radioactive isotope emitting them. For purposes of interpreting this disclosure and the claims that follow, a "high-energy" γ-ray is defined as a γ-ray having an energy greater than 1 MeV. A proposed mechanism by which high-energy γ-rays are produced in fission processes is described elsewhere (See, for example, the following references which are hereby incorporated herein by reference:

1. "Band Crossing Observed in Neutron-Rich Pd Isotopes via Spontaneous Fission of $^{252}$Cf," R. Aryaeinejad, J. D. Cole, R. C. Greenwood, S. S. Harrill, N. P. Lohstreter, K. Butler-Moore, S. Zhu, J. H. Hamilton, A. V. Ramayya, X. Zhao, W. C. Ma, J. Kormicki, J. K. Deng, W. B. Gao, I. Y. Lee, N. R. Johnson, F. K. McGowan G. Ter-Akopian and Y. Oganessian, Phys. Rev. C48, 566 (1993).
2. "Levels in $^{136}$Te and New High-Spin States in Neutron-Rich N=84 Isotones," K. Butler-Moore, J. H. Hamilton, A. V. Ramayya, S. Zhut, X. Zhao, W. C. Ma, J. Kormicki, J. K. Deng, W. B. Gao, J. D. Cole, R. Aryaeinejad, I. Y. Lee, N. R. Johnson, F. K. McGowan, G. Ter-Akopian and Y. Oganessian, J. Phys. G19 L121 (1993).
3. "Neutron Multiplicities and Yields of Correlated Zr—Ce and Mo—Ba Fragment Pairs in Spontaneous Fission of $^{252}$Cf," G. M. Ter-Akopian, J. H. Hamilton, Yu. Ts. Oganessian, J. Kormicki, G. S. Popeko, A. V. Daniel, A. V. Ramayya, Q. Lu, K. Butler-Moore, W. C. Ma, J. K. Deng, J. Kliman, V. Polhorsky, M. Morha, W. Greiner, A. Sandulescu, J. D. Cole, R. Aryaeinejad, N. R. Johnson, I. Y. Lee, F. K. McGowan, Phys. Rev. Lett. 73 (1994) 1447.
4. "Zero Neutron Emission in Spontaneous Fission of $^{252}$Cf: a Form of Cluster Radioactivity," J. H. Hamilton, A. V. Ramayya, J. Kormicki, W.-C. Ma, Q. Lu, D. Shi, J. K. Deng, S. J. Zhu. A. Sandulescu, W. Greiner, G. M. Ter-Akopian, Yu. Ts. Oganessian, G. S. Popeko, A. V. Daniel, J. Kliman, V. Polhorsky, M. Morha_J. D. Cole, R. Aryaeinejad, I. Y. Lee, N. R. Johnson, F. K. McGowan, J. Phys. G: Nucl. Part. Phys. 20 (1994) L85–L89.
5. "Correlated Yields and the Emission of Neutrons of Mo/Ba Fragments from $^{252}$Cf," J. Kliman, V. Polhorsky, M. Morha_G. M. Ter-Akopian, Ts. Yu. Oganessian, G. S. Popeko, A. V. Daniel, J. H. Hamilton, K. Butler-Moore, A. V. Ramayya, W.-C. Ma, X. Zhao, Q. Lu, D. Shi, J. K. Deng, J. Kormicki, S. Zhu, J. D. Cole, R. Aryaeinejad, R. C. Greenwood, S. S. Harrill, N. D. Lohstreter, I. Y. Lee, N. R. Johnson, and F. K. McGowan, Yad. Fiz. [Sov. J. Nucl. Phys.] 57, 1108 (1994).

6. "New Insights from Studies of Spontaneous Fission with Large Detector Arrays," J. H. Hamilton, A. V. Ramayya, S. J. Zhu, G. M. TerAkopian, Ts. Yu. Oganessian, J. D. Cole, J. O. Rasmussen, and M. Stoyer, Prog. Part. Nucl. Phys. 35 635–704 (1995).

7. "Evidence of Unique Parity Band Structure in Neutron-Rich Odd-A Ru Isotopes," K. Butler-Moore, R. Aryaeinejad, J. D. Cole, Y. Dardenne, M. Drigert, R. G. Greenwood, J. H. Hamilton, A. V. Ramayya, W.-C. Ma, B. R. S. Babu, J. O. Rasmussen, M. A. Stoyer, S. Y. Chu, K. E. Gregorich, M. F. Mohar, S. Asztalos, S. G. Prussin, K. J. Moody, R. W. Lougheed, and J. F. Wild, Phys. Rev. C52, 1339 (1995).

8. "Application of X-rays in Prompt Spectroscopy of $^{252}$Cf Fission Fragments," K. Butler-Moore, R. Aryaeinejad, J. D. Cole, Y. Dardenne, R. C. Greenwood, and H. M. Winston, Nucl. Instr. and Meth. A361 (1995) 245–252.

9. "Octupole Deformation in $^{142,143}$Ba and New Band Structure in Neutron-Rich Ba-Isotopes," S. J. Zhu, M. G. Wang, Q. Lu, J. H. Hamilton, A. V. Ramayya, W.-C. Ma, J. Kormicki, B. R. S. Babu, D. Shi, J. K. Deng, I. K. Peker, J. O. Rasmussen, M. A. Stoyer, S. Y. Chu, K. E. Gregorich, M. F. Mohar, S. Asztalos, S. G. Prussin, J. D. Cole, R. Aryaeinejad, Y. X. Dardenne, M. Drigert, K. J. Moody, R. W. Lougheed, J. F. Wild, N. R. Johnson, I. Y. Lee, F. K. McGowan, G. Ter-Akopian, and Y. T. Oganessian, Phys. Lett. B B357 (1995) 273.

10. "Identification of Levels in $^{160}$Sm and High Spin States in $^{156,158}$Sm Nuclei," S. J. Zhu, J. H. Hamilton, A. V. Ramayya, B. R. S. Babu, Q. Lu, W.-C. Ma, T. N. Ginter, M. G. Wang, J. Kormicki, J. K. Deng, D. Shi, J. D. Cole, R. Aryaeinejad, J. O. Rasmussen, M. A. Stoyer, S. Y. Chu, K. E. Gregorich, M. F. Mohar, S. G. Prussin, Ter-Akopian, and Y. T. Oganessian, N. R. Johnson, I. Y. Lee, F. K. McGowan, J. Phys. G: Nucl. Part. Phys. 21 (1995) L57.

11. "Identification of $^{152}$Ce and Unexpected Variations in Moments of Inertia With Neutron Number and Spin in $^{142-148}$Ba, $^{144-152}$Ce, and $^{146-156}$Nd", S. J. Zhu, J. H. Hamilton, Q. H. Lu, A. V. Ramayya, M. G. Wang, B. R. S. Babu, T. N. Ginter, W.-C. Ma, J. K. Deng, D. Shi, J. Kormicki, J. D. Cole, R. Aryaeinejad, N. R. Johnson, I. Y. Lee, F. K. McGowan, Ter-Akopian, Y. T. Oganessian, J. O. Rasmussen, M. A. Stoyer, S. Y. Chu, K. E. Gregorich, M. F. Mohar, and S. G. Prussin, J. Phys. G 21, L75 (1995)

12. "Structure of $^{108,110,112}$Ru; Identical Bands in $^{108,110}$Ru," Q.-H. Lu, K. Butler-Moore, S. J. Zhu, J. H. Hamilton, A. V. Ramayya, V. E. Oberacker, W.-C. Ma, B. R. S. Babu, J. K. Deng, J. Kormicki, J. D. Cole, R. Aryaeinejad, Y. X. Dardenne, M. Drigert, L. K. Peker, J. O. Rasmussen, M. A. Stoyer, S. Y. Chu, K. E. Gregorich, I. Y. Lee, M. F. Mohar, J. M. Nitschke, N. R. Johnson, F. K. McGowan, G. M. Ter-Akopian, Yu. Ts. Oganessian, J. B. Gupta, Phys. Rev. C52, 1348 (1995).

13. "Structure of Neuton-Rich Nuclei and Neutron Multiplicities in Spontaneous Fission," J. H. Hamilton, G. M. Ter-Akopian, Yu. Ts. Oganessian, J. Kormicki, S. J. Zhu, M. G. Wang, Q.-H. Lu, K. Butler-Moore, A. V. Ramayya, W.-C. Ma, B. R. S. Babu, D. Shi, J. K. Deng, G. S. Popeko, A. V. Daniel, W. Greiner, A. Sandulescu, J. D. Cole, R. Aryaeinejad, J. Kliman, V. Polhorsky, M. Morha_, N. R. Johnson, I. Y. Lee, F. K. McGowan, L. K. Peker, Phys. Rep. 264, 215 (1995).

14. "Observation of cold fission in $^{242}$Pu spontaneous fission," Y. X. Dardenne, R. Aryaeinejad, S. Asztalos, B. R. S. Babu, K. Butler-Moore, S. Y. Chu, J. D. Cole, M. W. Drigert, K. E. Gregorich, J. H. Hamilton, J. Kormicki, I. Y. Lee, R. W. Lougheed, Q. H. Lu, W-C. Ma, M. F. Mohar, K. J. Moody, S. G. Prussin, A. V. Ramayya, J. O. Rasmussen, M. A. Stoyer, J. Wild Phys. Rev. C54, 206 (1996)

15. "Identification of γ transitions in $^{147}$Ba, $^{149}$Ce, and $^{151,153}$Nd," B. R. S. Babu, S. J. Zhu, A. V. Ramayya, J. H. Hamilton, L. K. Peker, M. G. Wang, T. N. Ginter, J. Kormicki, W. C. Ma, J. D. Cole, R. Aryaeinejad, K. Butler-Moore, Y. X. Dardenne, M. W. Drigert, G. M. Ter-Akopian, Yu. Ts. Oganessian, J. O. Rasmussen, S. Asztalos, I. Y. Lee, A. O. Macchiavelli, S. Y. Chu, K. E. Gregorich, M. F. Mohar, S. Prussin, M. A. Stoyer, R. W. Lougheed, K. J. Moody, and J. F. Wild, Phys. Rev. C54, 568 (1996)

16. "New Cold and Ultra Hot Binary and Cold Ternary Spontaneous Fission Modes for $^{252}$Cf and New Band Structures with Gammasphere," Hamilton, J. H., Ramayya, A. V., Hwang, J. K., Kormicki, J., Babu, B. R. S., Sandulescu, A., Florescu, A., Greiner, W., Ter-Akopian, G. M., Oganessian, Yu. Ts., Daniel, A. V., Zhu, S. J., Wang, M. G., Ginter, T., Deng, J. K., Ma, W. C., Popeko, G. S., Lu, Q. H., Jones, E., Dodder, R., Gore, P., Nazarewicz, W., Rasmussen, J. O., Asztalos, S., Lee, I. Y., Chu, S. Y., Gregorich, K. E., Macchiavelli, A. 0., Mohar, M. F., Prussin, S., Stoyer, M. A., Lougheed, R. W., Moody, K. J., Wild, J. F., Bernstein, L. A., Becker, J. A., Cole, J. D., Aryaeinejad, R., Dardenne, Y. X., Drigert, M. W., Butler-Moore, K., Donangelo, R. and Griffin, H. C., Prog. in Part. and Nuc. Phy. 38, 273 (1997).

17. "New Spontaneous Fission Mode for $^{252}$Cf: Indication of Hyperdeformed $^{144,145,146}$Ba at Scission", G. M. Ter-Akopian, J. H. Hamilton, Yu. Ts. Oganessian, A. V. Daniel, J. Kormicki, A. V. Ramayya, G. S. Popeko, B. R. S. Babau, Q.-H. Lu, K. Butler-Moore, W.-C. Ma, S. Cwiok, W. Nazarewicz, J. K. Deng, D. Shi, J. Kliman, M. Morhac, J. D. Cole, R. Aryaeinejad, N. R. Johnson, I. Y. Lee, F. K. McGowan, and J. X. Saladin, Phys. Rev. Lett. 77 32 (1996).

18. "Identification of $^{109}$Mo and possible octupole correlations in $^{107,109}$Mo," J. K. Hwang, A. V. Ramayya, J. H. Hamilton, L. K. Peker, J. Kormicki, B. R. S. Babu, T. N. Ginter, G. M. Ter-Akopian, Yu. Ts. Oganessian, A. V. Daniel, W. C. Ma, P. G. Varmette, J. O. Rasmussen, S. J. Asztalos, S. Y. Chu, K. E. Gregorich, A. O. Macchiavelli, R. W. Macleod, J. Gilat, J. D. Cole, R. Aryaeinejad, K. Butler-Moore, M. W. Drigert, M. A. Stoyer, Y. X. Dardenne, J. A. Becker, L. A. Bernstein, R. W. Lougheed, K. J. Moody, S. G. Prussin, H. C. Griffin, and R. Donangelo, Phy. Rev. C 56, 1344 (1997).

19. "Cold (neutronless) a ternary fission of $^{252}$Cf," A. V. Ramayya, J. H. Hamilton, J. K. Hwang, L. K. Peker, J. Kormicki, B. R. S. Babu, T. N. Ginter, A. Sandulescu, A. Florescu, F. Carstoiu, W. Greiner, G. M. Ter-Akopian, Yu. Ts. Oganessian, A. V. Daniel, W. C. Ma, P. G. Varmette, J. O. Rasmussen, S. J. Asztalos, S. Y. Chu, K. E. Gregorich, A. O. Macchiavelli, R. W. Macleod, J. D. Cole, R. Aryaeinejad, K. Butler-Moore, M. W. Drigert, M. A. Stoyer, L. A. Bernstein, R. W. Lougheed, K. J. Moody, S. G. Prussin, S. J. Zhu, H. C. Griffin, and R. Donangelo, Phy. Rev. C 57 2370 (1998).

20. "Identification of the gamma transitions in Tc and Cs products of $^{252}$Cf fission and possible 7/2+[413] bands in $^{105-109}$Tc isotopes," J. K. Hwang, A. V. Ramayya, J. H. Hamilton, L. K. Peker, J. Kormicki, B. R. S. Babu, T. N. Ginter, C. J. Beyer, J. O. Rasmussen, J. Gilat, S. J. Asztalos, S. Y. Chu, K. E. Gregorich, A. O. Macchiavelli, R. W. Macleod, G. M. Ter-Akopian, Yu. Ts. Oganessian, A. V. Daniel, W. C. Ma, P. G. Varmette, J. D. Cole, R. Aryaeinejad, K. Butler-Moore, M. W. Drigert, M. A. Stoyer, L.A. Bernstein, R. W. Lougheed, K. J. Moody, S. G. Prussin, H. C. Griffin, and R. Donangelo, Rev. C 57 2250 (1998).

21. "Identification of new negative-parity levels in $^{152,154}$Nd," X. Q. Zhang, J. H. Hamilton, A. V. Ramayya, L. K. Peker, J. K. Hwang, E. F. Jones, J. Komicki, C. J. Beyer, P. M. Gore, B. R. S. Babu, T. N. Ginter, S. J. Asztalos, S. Y. Chu, K. E. Gregorich, I. Y. Lee, A. O. Macchiavelli, R. W. Macleod, J. O. Rasmussen, J. Gilat, G. M. Ter-Akopian, Yu. Ts. Oganessian, A. V. Daniel, W. C. Ma, P. G. Varmette, J. D. Cole, R. Aryaeinejad, K. Butler-Moore, Y. X. Dardenne, M. W. Drigert, M. A. Stoyer, J. F. Wild, J. A. Becker, L. A. Bernstein, R. W. Lougheed, K. J. Moody, R. Donangelo, S. G. Prussin, and H. C. Griffin, Rev. C 57 2040 (1998).

22. "High spin octupole correlations in the N=85, $^{139}$Xe and $^{141}$Ba isotones," S. J. Zhu, J. H. Hamilton, A. V. Ramayya, M. G. Wang, E. F. Jones, J. K. Hwang, B. R. S. Babu, W. C. Ma, G. L. Long, M. Li, L. Y. Zhu, J. K. Deng, T. N. Ginter, J. Kormicki, J. D. Cole, R. Aryaeinejad, Y. K. Dardenne, M. W. Drigert, G. Ter Akopian, Yu. Ts. Oganessian, A. Daniel, J. O. Rasmussen, M. A. Stoyer, I. Y. Lee, S. Y. Chu, K. E. Gregorich, M. F. Mohar, S. G. Prussin, N. R. Johnson, and F. K. McGowan, J. Phys. G: Nucl. Part. Phys. 23 L77–L83 (1997).

23. "Identification of New Neutron-Rich Rare-Earth Isotopes Produced in $^{252}$Cf Spontaneous Fission," R. C. Greenwood, R. A. Anderl, J. D. Cole, H. Willmes, *Proceedings of the Fifth International Conference on Nuclei Far from Stability*, ed. by Ian S. Towner, Sep. 14–19, 1987, Rosseau Lake, Ontario, Canada (American Institute of Physics, New York, 1988) 786.

24. "An Isol Facility for $^{252}$Cf Fission Product Studies," R. A. Anderl, J. D. Cole and R. C. Greenwood, submitted to *On-Line Mass Separators, Radioactive Beams and Nuclei Far From Stability* meeting of The Third Chemical Congress of North America, Jun. 5–11, 1988, Toronto, Ontario, Canada.

25. "Nuclear Structure Studies of Neutron-Rich Nuclides Using a $^{252}$Cf based ISOL Facility," R. C. Greenwood, R. A. Anderl, J. D. Cole, M. W. Drigert, R. G. Helmer, M. A. Lee, C. W. Reich and D. A. Struttmann, submitted to *On-Line Mass Separators, Radioactive Beams and Nuclei Far From Stability* meeting of The Third Chemical Congress of North America, Jun. 5–11, 1988, Toronto, Ontario, Canada.

26. "Nuclear Data Measurements of Neutron-Rich Nuclides Produced in Fission using On-Line Isotope Separation," R. C. Greenwood, A. J. Caffrey, J. D. Cole, M. W. Drigert, R. G. Helmer, M. A. Lee, C. W. Reich and D. A. Struttmann, submitted to *International Conference on Nuclear Data for Science and Technology* Jun. 3, 1998, Mito, Japan.

27. "High Spin States in Neutron Rich Nuclei," S. Zhu, X. Zhao, J. H. Hamilton, A. V. Ramayya, Q. Lu, W.-C. Ma, L. K. Peker, J. Kromicki, X. Hong, W. B. Gao, J. K. Deng, I. Y. Lee, N. R. Johnson, F. K. McGowan, C. E. Bemis, J. D. Cole, R. Aryaeinejad, G. Ter-Akopian, and Yu Oganessian, *XV Nuclear Physics Symposium*, Ed., P. Hess. Rev. Mex. Fis. 38, 53 (Oaxtepec, Mexico, January 1992).

28. "High Spin States in Neutron Rich Nuclei From Spontaneous Fission," K. Butler-Moore, S. Zhu, X. Zhao, J. H. Hamilton, A. V. Ramayya, Q. Lu, W.-C. Ma, L. K. Peker, J. Kromicki, J. K. Deng, P. Gore, D. Shi, E. F. Jones, H. Xie, W. B. Gao, J. D. Cole, R. Aryaeinejad, I. Y. Lee, N. R. Johnson, F. K. McGowan, C. E. Bemis, G. Ter-Akopian, and Yu Oganessian, Proceedings of *International Conference on Nuclei Far From Stability and Atomic Masses*, (Bernkastel-Kues, Germany, Jul. 19–24, 1992) p. 551.

29. "A New Spontaneous Fission Mode for $^{252}$Cf: Hyperdeformation, Cluster Radioactivity, New Levels," J. H. Hamilton, G. M. Ter-Akopian, Yu. Ts. Oganessian, A. V. Daniel, J. Kormicki, G. S. Popeko, A. V. Ramayya, Q. Lu, K. Butler-Moore, W.-C. Ma, S. _wiok, W. Nazarewicz, W. Greiner, A. Sandulescu, J. K. Deng, D. Shi, J. Kliman, M. Morha_, J. D. Cole, R. Aryaeinejad, S. J. Zhu, R. Babu, N. R. Johnson, I. Y. Lee, F. K. McGowan, J. X. Saladin, Presented at European Physical Society, XV Nuclear Physics Divisional Conference, Low Energy Nuclear Dynamics, Apr. 18–22, 1995, St. Peterburg, Russia, 187.

30. "Extended Identical Bands in $^{98,100}$Sr and $^{108,110}$Ru and New High Spin States in $^{98-102}$Zr and $^{112-116}$Pd," J. H. Hamilton, Q.-H. Lu, S. J. Zhu, K. Butler-Moore, A. V. Ramayya, W.-C. Ma, B. R. S. Babu, T. N. Ginter, J. Kormicki, J. K. Deng, D. Shi, L. K. Peker, J. O. Rasmussen, M. A. Stoyer, S. Y. Chu, K. E. Gregorich, M. F. Mohar, S. Prussin, J. D. Cole, R. Aryaeinejad, N. R. Johnson, I. Y. Lee, F. K. McGowan, G. M. Ter-Akopian, Yu. Ts. Oganessian, International Conference on Exotic Nuclei and Atomic Masses, Jun. 19–23, 1995, Arles France.

31. "Octupole Deformation in Neutron-Rich $^{142,143}$Ba and $^{144}$Cs and Identical Ground and Octupole Bands in $^{144,146}$Ba," S. J. Zhu, M. G. Wang, Q. Lu, J. H. Hamilton, A. V. Ramayya, W.-C. Ma, J. Kormicki, B. R. S. Babu, T. N. Ginter, D. Shi, J. K. Deng, I. K. Peker, J. O. Rasmussen, M. A. Stoyer, S. Y. Chu, K. E. Gregorich, M. F. Mohar, S. G. Prussin, J. D. Cole, R. Aryaeinejad, N. R. Johnson, I. Y. Lee, F. K. McGowan, G. Ter-Akopian, and Ts. Yu. Oganessian, International Conference on Exotic Nuclei and Atomic Masses, Jun. 19–23, 1995, Arles France.

32. "Identification of Levels in $^{152}$Cs, $^{160}$Sm and Higher Spin States and Identical Bands in Neutron-Rich Ce, Nd, Sm Isotopes," S. J. Zhu, J. H. Hamilton, A. V. Ramayya, Q. Lu, W.-C. Ma, B. R. S. Babu, J. Kormicki, T. N. Ginter, D. Shi, J. K. Deng, I. K. Peker, J. O. Rasmussen, M. A. Stoyer, S. Y. Chu, K. E. Gregorich, M. F. Mohar, S. G. Prussin, J. D. Cole, R. Aryaeinejad, N. R. Johnson, I. Y. Lee, F. K. McGowan, G. Ter-Akopian, and Ts. Yu. Oganessian, International Conference on Exotic Nuclei and Atomic Masses, Jun. 19–23, 1995, Arles France.

33. "Nuclear Structure and High Spin States in Neutron-Rich Nuclei From Spontaneous Fission," R. Aryaeinejad, J. D. Cole, R. C. Greenwood, J. H. Hamilton, K. Butler-Moore, A. V. Ramayya, W. C. Ma, J. Kormicki, N. R. Johnson, F. K. McGowan, G. Terakopian and Y. Oganessian, Invited talk given at Symposium on "Nuclear Structure and Reactions, The Interface" Division of Nuclear Chemistry, American Chemical Society Meeting in Washington D.C. Aug. 21–26, (1994).

34. "Gamma-Ray Studies of the Spontaneous Fission of $^{242}$Pu and $^{252}$Cf Using Gammasphere", M. A. Stoyer, J. O. Rasmussen, F. Chu, K. E. Gregorich, I. Y. Lee, M. F. Mohar, J. M. Nitschke, K. Moody and R. Lougheed, S. G. Prussin and S. Asztalos, R. Aryaeinejad, J. Cole, Y. X.

Dardenne, M. Drigert, J. Hamilton, Q. H. Lu, W. C. Ma, and A. V. Ramayya, invited talk given at Symposium on "Nuclear Structure and Reactions, The Interface" Division of Nuclear Chemistry, American Chemical Society Meeting Washington D.C., Aug. 21–26, (1994).

35. "Yields of Correlated Fragment Pairs in Spontaneous Fission of $^{252}$Cf," G. M. Ter-Akopian, Ts. Yu. Oganessian, G. S. Popeko, A. V. Daniel, J. H. Hamilton, K. Butler-Moore, A. V. Ramayya, W. C. Ma, J. Kormicki, Q. Lu, J. D. Cole, R. Aryaeinejad, J. Kliman, V. Polhorsky, M. Morhac, N. R. Johnson, I. Y. Lee, F. K. McGowan, Bull. Am. Phys. Soc. 38, 1806 (1993).)

The high-energy γ-rays are particularly suitable for identifying radioisotopes because such γ-rays occur in a region of the energy spectrum wherein there is little background noise to interfere with accurate detection of the energy of the γ-rays. Also, high-energy γ-rays specific to particular radioisotopes tend to have energies that are well-separated from the energies of high-energy γ-rays of other radioisotopes. By "well-separated" it is meant that the energies tend to be separated by at least 0.1 MeV. Further, high-energy γ-rays can frequently penetrate retaining materials that contain lower energy particles. Thus, high-energy γ-rays can be utilized for characterizing radioactive materials contained in retaining materials in situations where prior art methods would require destruction of the retaining materials prior to the characterization.

Figure 2:
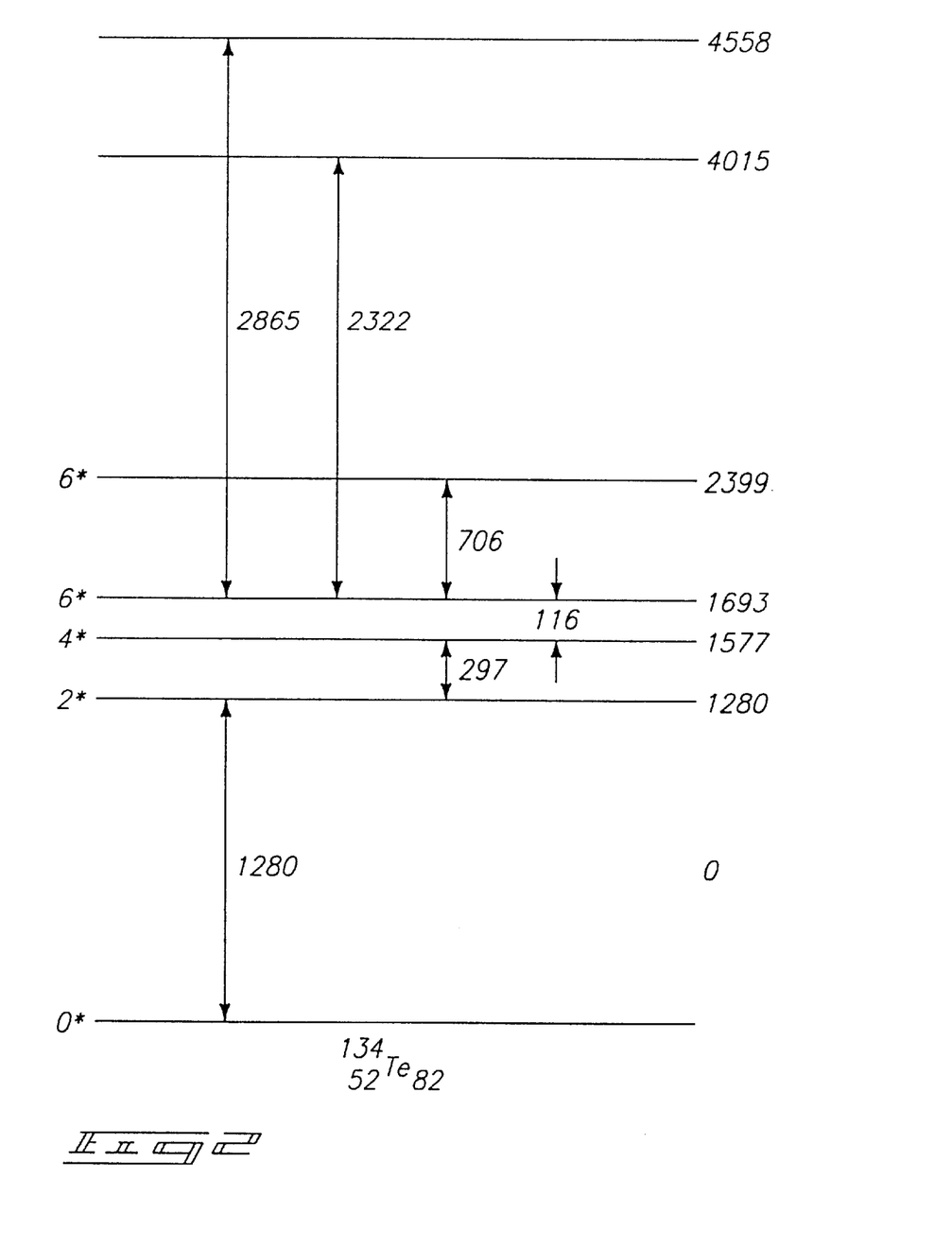
FIG. 2 is an energy level diagram for $^{134}$Te.

An exemplary radioisotope that can undergo fission to emit neutrons and high-energy γ-rays is $^{235}$U, which can fission to produce $^{134}$Te. A decay profile for $^{134}$Te is illustrated in FIG. 2. Energy states of the radioisotope are shown as horizontal lines, and transitions between the energy states are illustrated as vertical arrows. Energies are shown in keV. The illustrated decay profile shows that there are three transitions which can lead to high-energy γ-rays. Such three transitions have energies of 2.865 MeV, 2.322 MeV and 1.280 MeV. As an aside, and as further explanation of the term "coincidence," it is noted that vertical lines that are side-by-side in FIG. 2 (like the 2.865, 2.322 and 0.706 MeV transitions) are not in coincidence, but lines that have a head-to-tail relation, even with intervening γ-rays, (like the 2.865 and 1.280 MeV transitions) are in coincidence.

Figure 3:
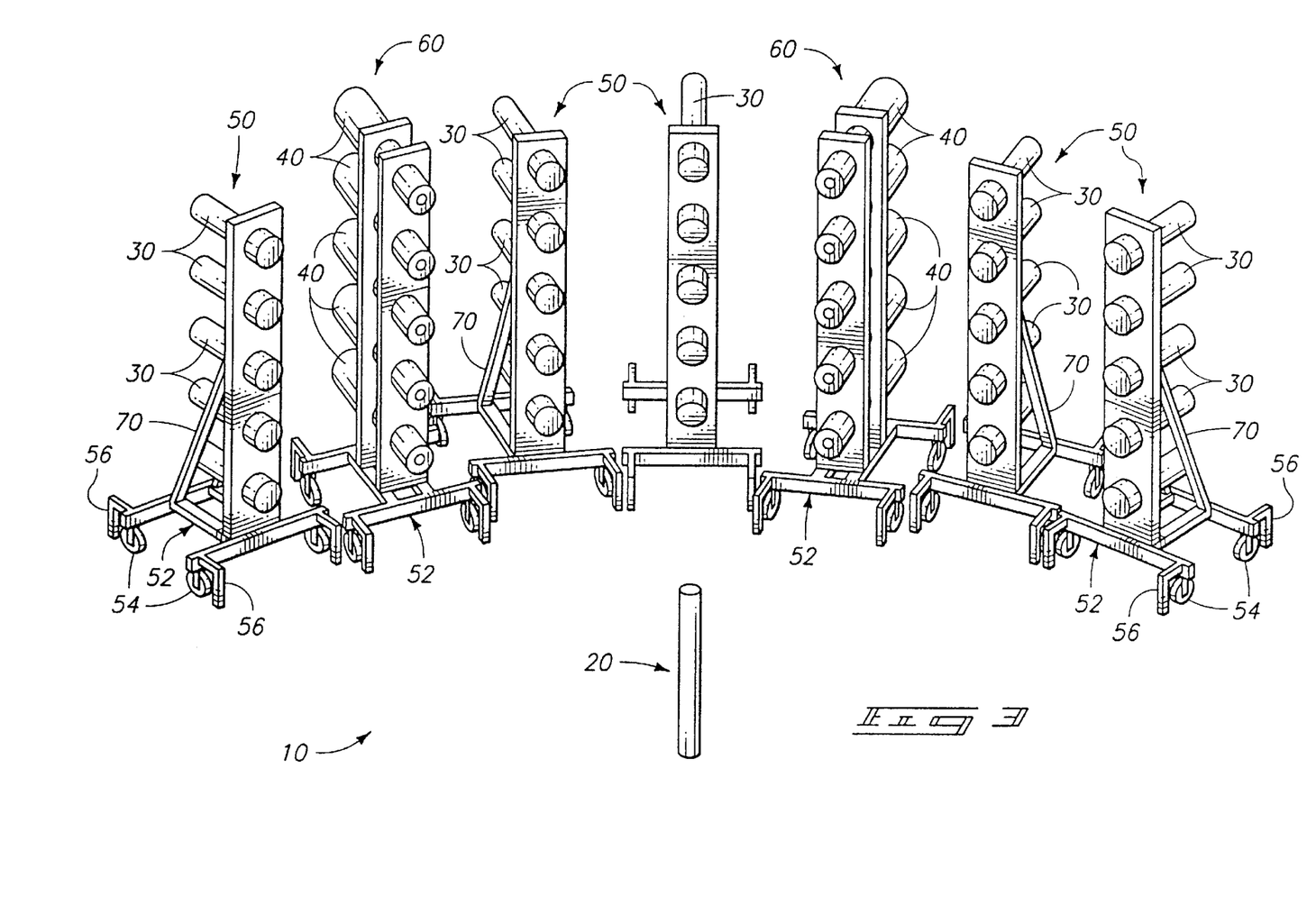
FIG. 3 is a diagrammatic view of an apparatus of the present invention configured for identifying and quantitating radioactive nuclei of a sample.

Referring to FIG. 3, a preferred detector array 10 of the present invention is illustrated. A sample 20 is provided proximate array 10. Sample 20 comprises a radioactive material which generates decay particles. Such decay particles preferably comprise high-energy γ-rays and neutrons. Sample 20 can be, for example, a thirty gallon barrel of radioactive waste, or a spent fuel rod. Detector array 10 comprises a plurality of scintillation/phototube detectors 30 (only some of which are labeled) and a plurality of germanium crystal detectors 40 (only a few of which are labeled). Scintillation/phototube detectors are provided on mobile stands 50 with each of stands 50 configured to hold 5 detectors. Stands 50 comprise bases 52, having wheels 54 and braking posts 56. Wheels 54 enable stands 50 to be readily moved into various positions relative to sample 20, as long as braking posts 56 are elevated above a ground surface. Once stands 50 are in a desired location proximate sample 20, braking posts 56 can be lowered to contact a ground surface and thereby substantially prevent stands 50 from moving relative to sample 20. A suitable distance of stands 50 from sample 20 is, for example, from about 10 inches to about 40 inches. Such distance can vary, however, depending on a size and sensitivity of detectors 30.

Germanium crystal detectors 40 are arranged on stands 60, with each of stands 60 holding 5 of detectors 40. Stands 60, like stands 50, comprise bases 52 having wheels and braking posts. A suitable distance of stands 60 from sample 20 is, for example, from about 15 inches to about 60 inches. Such distance can vary, however, depending on a size and sensitivity of detectors 40.

A difference between stands 50 and stands 60 is that stands 50 comprise movable back braces 70 which enable the detectors 30 on stands 50 to be tilted from vertical. Such tilting can sometimes be advantageous in achieving appropriate orientation of liquid scintillator material of detectors 30 relative to sample 20. For instance, detectors 30 will frequently have a window through which neutrons pass to reach liquid scintillation material. It can be desired to tilt detectors 30 to have such window exposed to sample 20 for maximum throughput of neutrons from sample 20 to the liquid scintillation material.

The diagrammatic view of FIG. 3 is for illustration purposes only, and is not intended to indicate actual scale. Preferred dimensions of the liquid scintillation detectors of liquid scintillation/phototube detectors 30 are approximately 2" by 2" by 2", and preferred dimensions of the germanium crystals of germanium crystal detectors 40 are approximately 2" in length by about 1" diameter, when the crystals are in a preferred shape approximating a cylinder. Preferred germanium detectors preferably comprise single crystals of germanium in a shape approximating a cylinder and having a diameter that is less than about one-half of a length of the crystal.

Apparatus 10 will preferably comprise about twice as many liquid state detectors 30 as solid state detectors 40, and most preferably comprises 48 liquid state detectors and 20 solid state detectors. The 48 liquid state detectors can be arranged on, for example, stands comprising 6 or 8 liquid state detectors. A measure of efficiency of a detector is so-called "geometrical efficiency". Preferably, liquid state detectors 30 have a geometrical efficiency of from about 10% to about 12%. Regardless of the efficiency of the detectors, the detectors are preferably sized and positioned such that solid state detectors 40 receive a total number of counts that is less than or equal to 100,000 counts per second (hertz) and liquid state detectors 30 receive a total number of counts that is less than or equal to 1 million hertz.

Figure 4:
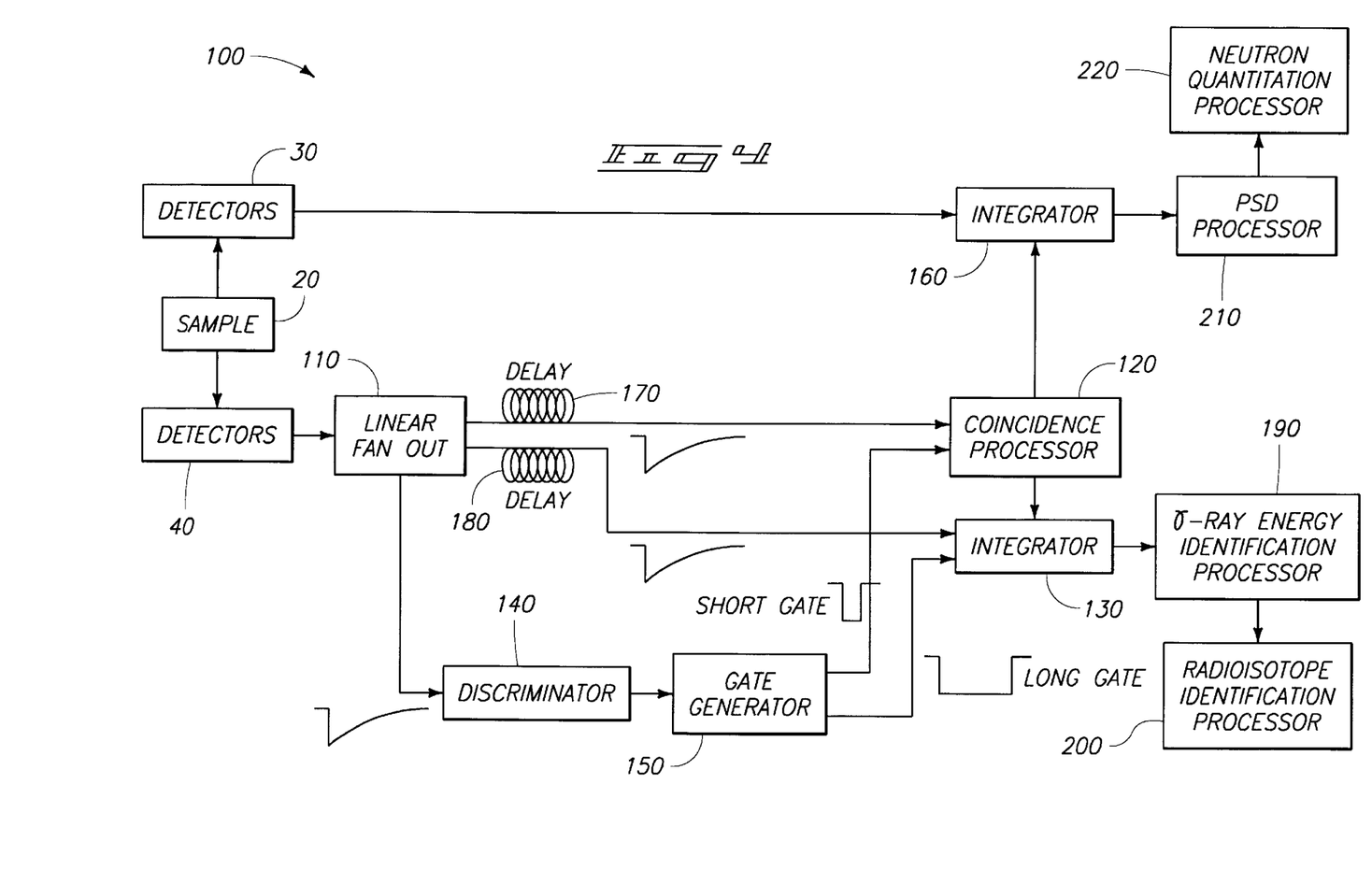
FIG. 4 is a schematic circuitry diagram of an apparatus of the present invention for identifying and quantitating radioactive nuclei of a sample.

FIG. 4 is a schematic block diagram of preferred circuitry 100 of an apparatus of the present invention. For simplicity of illustration and explanation, only solid state detectors 40 are shown as being utilized to detect an initial coincidence event. However, it is to be understood that liquid state detectors 30 could also be utilized for detecting an initial coincidence event. An electrical signal from a detector 40 is sent to a linear fan out 110. Linear fan out 110 is a X1 charge amplifier that gives multiple outputs, identical to the input, with a propagation delay of approximately 20 to 30 nanoseconds. The linear fan out generates three signals which are sent to a coincidence processor 120, a first integrator 130 and a discriminator 140. Discriminator 140 can be, for example, any type of threshold discriminator (leading edge discriminator, Constant Fraction Discriminator (CFD), integrating discriminator, etc.). Coincidence processor 120 can comprise, for example, a microchip configured to ascertain if 2 or more signals are received.

Discriminator 140 sends a timing signal to a gate generator 150. The timing signal is utilized to generate two gate pulses as shown in FIG. 4. A short gate pulse is sent to coincidence detector 120 and utilized to detect coincidence. The short gate pulse will preferably correspond to a width of less than or equal to about 10 nanoseconds. Coincidence processor 120 is configured to ascertain if a second signal from detectors 40 is received within a predetermined time. If such second signal is received, coincidence is established and coincidence processor 120 "opens" integrators 130 and 160 to integrate further signals received from detectors 30 and 40 within a predetermined time established by the long gate. Such predetermined time will preferably be from about 150 to about 200 nanoseconds. Integrators 130 and 160 can comprise, for example, analog to digital converters coupled with software configured to integrate the intensity of signals received by integrators 130 and 160. The term "open" used in referring to integrators 130 and 160 indicates that information is processed by the integrators and/or stored from the integrators in one or more processing and storing steps. The term "open" is in contrast to a "closed" state of the integrators wherein information not subjected to at least one of the processing or storing steps. Preferably, in the "closed" state none of processing and storage steps associated with integrators 130 and 160 occur. Elimination of such steps can avoid wasted processing time and thereby speed an apparatus 100 of the present invention.

Apparatus 100 further comprises delays 170 and 180 provided between coincidence processor 120 and integrator 130, respectively, and linear fan out 110. Delays 170 and 180 are preferably of sufficient length to delay detector pulses to correct timing relationships with the short and long gates such that the pulses will not be lost during processing by discriminator 140 and gate generator 150. Delays 170 and 180, as well as gate generator 150, preferably comprise so-called "cable delay systems". In other words, delays 170 and 180, as well as the short and long gates, are preferably accomplished utilizing cables cut to predetermined lengths to delay an electrical signal for a predetermined period of time. Such use of cable delay systems can enhance the robustness of an apparatus of the present invention relative to that which would exist if other circuitry were utilized to create the delays and gates.

It is noted that the two or more coincidence signals received from detectors 40 will generally each be received from a different detector due to relatively long detector response times and the short coincidence time windows utilized. Also, it is noted that coincidence processor 120 can be configured to turn on integrators 130 and 160 in response to any predetermined number of signals. In the exemplary embodiment discussed above, coincidence processor 120 opened integrators 160 and 130 in response to two signals. However, coincidence processor 120 could also be configured to open integrators 160 and 130 in response to three or more signals. Utilizing three or more signals to establish coincidence can increase suppression of background noise. However, such effect can also be realized by subsequent processing of data acquired with two signals establishing coincidence. However, if three or more signals are utilized to establish coincidence, data that would have been acquired if only two signals had been utilized to establish coincidence will be lost. Accordingly, it is generally preferable to utilize only two signals to establish coincidence, and then to utilize further processing for background suppression in circumstances where additional background suppression is desired.

After coincidence is established by coincidence processor 120, integrator 130 is effectively turned on ("opened") and signals from detectors 40 are passed through integrator 130 and to a γ-ray energy identification processor 190. The γ-ray energy identification processor 190 ascertains energy of γ-rays impacting detectors 40 from signals received through integrator 130. Information from γ-ray energy identification processor 190 is then transferred to a radioisotope identification processor 200 which compares the γ-ray energy to standards to identify an atomic constituent (radioisotope) of a radioactive material in an analyzed sample. Integrator 130, γ-ray energy identification processor 190 and radioisotope identification processors 200 can comprise separate components, or can comprise, for example, software integrated into a single program. In preferred embodiments of the present invention, integrator 130 comprises an analog to digital converter. The digital signals are stored to a storage media and later processed by software to accomplish one or more of integration, γ-ray energy identification, and radioisotope identification.

Once coincidence is established, coincidence processor 120 also turns on an integrator 160 which processes signals received from liquid scintillation detectors 30. Integrator 160 can comprise an analog to digital convertor. The integrated signals are passed to a Pulse Shape Discrimination (PSD) processor 210 which distinguishes signals corresponding to neutron stimulation of liquid scintillation detectors 30 from signals corresponding to γ-ray stimulation of liquid scintillation detectors 30.

Information from PSD processor 210 is then passed to a neutron quantitation processor 220 which quantitates a rate at which neutrons are detected by liquid scintillation detectors 30. Neutron quantitation processor 220 can further utilize the rate at which neutrons are detected to quantitate a rate at which sample 20 (FIG. 3) emits neutrons utilizing relationships known to person of ordinary skill in the art. Such relationships can include, for example, multiplying the number of neutrons detected by scintillation detectors 30 by numerical values that compensate for a geometric efficiency and an intrinsic efficiency of the liquid scintillation/phototube detection system. Also, neutron quantitation processor 220 can be configured to determine if detected neutrons are associated with coincident detection events, and to quantitate data only for those neutrons found to be associated with coincident detection events. After neutron quantitation processor 220 quantitates a rate at which sample 20 emits neutrons, the processor can utilize such information to quantitate an amount of radioactive atoms present in the radioactive material of sample 20 utilizing relationships known to persons with ordinary skill in the art. In preferred embodiments of the present invention, integrator 160 comprises an analog to digital converter. The digital signals are stored to a storage media and later processed by software to accomplish one or more of integration, PSD processing, and neutron quantitation processing.

Through the above-described data acquisition and processing, system 100 can be utilized to quantitate an amount of radioactive material present in a sample, and to identify the types of radioisotopes which are decaying within the sample.

It is noted that PSD processor 210 can utilize PSD methods discussed in the "Background" section of this invention. However, the invention also encompasses improvements to PSD processes. As discussed in the "Background" section of this invention, prior art PSD processes integrate at least a portion of a trailing edge signal (the trailing edge is illustrated as "C" in prior art FIG. 1) to establish a trailing edge intensity, and then ratio such trailing edge intensity to a total intensity of a signal (obtained by integrating under all of the regions "A", "B", and "C" of the FIG. 1 pulse shapes) to establish a value. Such value can then be compared to standard values to determine if a signal was generated by γ-ray interaction with a liquid scintillation material or by neutron stimulation of a liquid scintillation material.

A PSD method of the present invention establishes a final intensity as the intensity under FIG. 1 trailing edge region "C" and an initial intensity as the intensity under FIG. 1 leading edge region "A". For purposes of the present discussion, a leading edge is defined as an edge terminating at or before a peak intensity (such as peak intensity "B" of FIG. 1) and a trailing edge is defined as a edge initiating at or after a peak intensity. The initial intensity is then ratioed to the final intensity to distinguish signals caused by neutron stimulation of scintillating liquid from signals caused by γ-ray stimulation of scintillation liquid. A difference between the present method and the prior art method described in the "Background" of this disclosure is that the ratio of the present method does not include a sum of the final intensity with the initial intensity. Note that the prior art PSD methods discussed in the "Background" section of this disclosure effectively ratioed a final intensity relative to a sum of an initial intensity and a final intensity. A PSD method of the present invention can be advantageous over prior art methods in that a method of the present invention can have larger relative differences between neutron stimulated signals and γ-ray stimulated signals. Such larger relative differences can simplify distinguishing neutron stimulated signals from γ-ray stimulated signals.

An advantage of the present invention over prior art methods can be in the acquisition speed and efficiency of the present invention. By utilizing γ-rays and fast neutrons to for identification and quantitation of fissile material, the present invention can be faster than prior art methods.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of detecting radioactive decay, comprising:
    providing a sample comprising a radioactive material, the radioactive material generating decay particles;
    providing a plurality of detectors proximate the sample, the detectors comprising a first set and a second set, the first set of the detectors secured to a first discrete stand, the first stand movable relative the sample, and the first set of the detectors comprising liquid state detectors utilizing liquid scintillation material coupled with phototubes to generate a first electrical signal in response to decay particles stimulating the liquid scintillation material, the second set of the detectors secured to a second discrete stand separate from the first discrete stand, the second discrete stand movable relative the sample and independent of the first discrete stand, and the second set of the detectors comprising solid state detectors utilizing a crystalline solid to generate a second electrical signal in response to decay particles stimulating the crystalline solid;
    stimulating at least one of the detectors to generate at least one of the first and second electrical signals, the at least one of the first and second electrical signals being indicative of radioactive decay in the sample.

2. The method of claim 1 wherein the providing the detectors comprises providing at least about twice as many liquid state detectors as solid state detectors.

3. The method of claim 1 wherein the crystalline solid present in any individual detector of the solid state detectors is present as a single crystal of germanium.

4. The method of claim 1 wherein every individual detector of the solid state detectors is configured to detect less than 100,000 counts/second.

5. The method of claim 1 wherein every individual detector of the liquid state detectors is configured to detect less than 1,000,000 counts/second.

6. The method of claim 1 wherein every individual detector of the solid state detectors is configured to detect less than 100,000 counts/second; and wherein every individual detector of the liquid state detectors is configured to detect less than 1,000,000 counts/second.

7. A method of distinguishing neutron stimulation of a radiation particle detector from γ-ray stimulation of the detector, comprising:
    providing a sample comprising a radioactive material, the radioactive material generating decay particles, the decay particles comprising γ-rays and neutrons;
    providing a plurality of radiation particle detectors proximate the sample, the detectors generating electrical signals in response to decay particles stimulating the detectors;
    stimulating one or more of the detectors to generate electrical signals; the electrical signals, when graphed as intensity vs. time, having a leading edge, a trailing edge, and a total area; the leading edge initiating at or before a peak intensity and the trailing edge initiating at or after the peak intensity; an initial intensity being defined as the sum of intensity underlying the leading edge; a final intensity being defined as the sum of intensity underlying the trailing edge;
    forming a ratio of the initial intensity to the final intensity to distinguish electrical signals caused by neutron stimulation of the detectors from electrical signals caused by γ-ray stimulation of the detectors, the ratio not including a sum of the final intensity with the initial intensity; and
    after distinguishing the electrical signals caused by neutron stimulation of the detectors, quantitating a rate at which neutrons are detected.

8. The method of claim 7 wherein the only neutrons detected are neutrons emitted by fission events, and emitted within $10^{-22}$ seconds of said fission events.

9. The method of claim 7 further comprising:
    utilizing the rate at which neutrons are detected to quantitate a rate at which the sample emits neutrons; and
    quantitating an amount of radioactive atoms present in the radioactive material from the rate at which the sample emits neutrons.

10. The method of claim 9 wherein the quantitating a rate consists of quantitating a rate at which coincident neutrons are detected, with coincident neutrons being defined as neutrons detected within 300 nanoseconds of at least one other neutron being detected.

11. The method of claim 9 wherein the quantitating a rate consists of quantitating a rate at which coincident neutrons are detected, with coincident neutrons being defined as neutrons detected within 10 nanoseconds of at least one other neutron being detected.

12. A method of quantitating an amount of radioactive nuclei present in a sample, comprising:
    providing a sample comprising a radioactive material, the radioactive material generating neutrons by fission events;
    detecting neutrons emitted within $10^{-22}$ seconds of said fission events;
    quantitating a rate of emission of neutrons from the sample utilizing the detected neutrons; and quantitating an amount of radioactive atoms present in the radioactive material from the rate of emission of neutrons from the sample.

13. The method of claim 12 wherein the quantitating a rate consists of quantitating a rate at which coincident neutrons are detected, with coincident neutrons being defined as neutrons detected within 300 nanoseconds of at least one other neutron being detected.

14. The method of claim 12 wherein the quantitating a rate consists of quantitating a rate at which coincident neutrons are detected, with coincident neutrons being defined as neutrons detected within 10 nanoseconds of at least one other neutron being detected.

15. The method of claim 12 wherein the only neutrons detected are neutrons emitted within $10^{-22}$ seconds of the fission events.

16. A method of identifying and quantitating radioactive nuclei comprising:

providing a sample comprising a radioactive material, the radioactive material generating decay particles, the decay particles comprising neutrons and high-energy γ-rays;

providing a plurality of detectors proximate the sample, the detectors comprising a first set and a second set, the first set of the detectors utilizing liquid scintillation material coupled with phototubes to generate a first electrical signal in response to decay particles stimulating the liquid scintillation material, the second set of the detectors utilizing a crystalline solid to generate a second electrical signal in response to decay particles stimulating the crystalline solid;

ascertaining the energy of decay particles generating the second electrical signals;

comparing the energy of the decay particles to standards to identify an atomic constituent of the radioactive material;

collecting first signals from the phototubes; the first signals, when graphed as intensity vs. time, having a leading edge, a trailing edge, and a total area; the leading edge terminating at or before a peak intensity and the trailing edge initiating at or after the peak intensity; an initial intensity being defined as the sum of intensity underlying the leading edge; a final intensity being defined as the sum of intensity underlying the trailing edge;

forming a ratio of the initial intensity to the final intensity to distinguish first signals caused by neutron stimulation of the scintillating liquid from first signals caused by γ-ray stimulation of the scintillating liquid, the ratio not including a sum of the final intensity with the initial intensity;

after distinguishing the electrical signals caused by neutron stimulation of the detectors, quantitating a rate at which neutrons are detected;

utilizing the rate at which neutrons are detected to quantitate a rate at which the sample emits neutrons; and quantitating an amount of radioactive atoms present in the radioactive material from the rate at which the sample emits neutrons.

17. The method of claim 16 wherein the leading edge terminates at the peak intensity and the trailing edge initiates after the peak intensity.

18. A method of detecting radioactive nuclei comprising:

providing a sample comprising a radioactive material, the radioactive material generating a high-energy γ-ray;

detecting an energy associated with the γ-ray;

identifying a type of radioactive nuclei present in the material from the energy; and wherein the detecting comprises providing an array of solid state detectors, every individual detector of the array of solid state detectors being configured to detect less than 100,000 counts/second.

19. The method of claim 18 wherein the solid state detectors comprise germanium, and wherein all of the germanium present in any individual detector is present as a single crystal.

20. An apparatus for detecting radioactive decay, comprising:

a plurality of liquid state detectors configured to be proximate a sample, the liquid state detectors comprising liquid scintillation material coupled with phototubes and being configured to generate a first electrical signal in response to radioactive decay particles stimulating the liquid scintillation material; and a plurality of solid state detectors configured to be proximate the sample, the solid state detectors comprising a crystalline solid and being configured to generate a second electrical signal in response to radioactive decay particles stimulating the crystalline solid; and wherein every individual detector of the solid state detectors is configured to detect less than 100,000 counts/ second.

21. The apparatus of claim 20 comprising about twice as many liquid state detectors as solid state detectors.

22. The apparatus of claim 20 wherein the crystalline solid present in any individual detector of the solid state detectors is present as a single crystal of germanium.

23. The apparatus of claim 20 wherein every individual detector of the liquid state detectors is configured to detect less than 1,000,000 counts/second.

24. An apparatus for identifying and quantitating radioactive nuclei of a sample comprising radioactive material that decays to generate netrons and high-energy γ-rays, the apparatus comprising:

a plurality of detectors configured to be proximate the sample, the detectors comprising a first set and a second set, the first set of the detectors secured to a first discrete stand, the first stand movable relative the sample, and the first set of the detectors comprising liquid scintillation material coupled with phototubes and being configured to generate a first electrical signal in response to decay particles stimulating the liquid scintillation material, the second set of the detectors secured to a second discrete stand separate from the first discrete stand, the second discrete stand movable relative the sample and independent of the first discrete stand, and the second set of the detectors comprising a crystalline solid and being configured to generate a second electrical signal in response to decay particles stimulating the crystalline solid;

a first processing system configured to processed the first electrical signals; and a control system configured to selectively pass the first electrical signals to the first processing system responsive to a predetermined number of first or second electrical signals being generated within a predetermined period of time.

25. The apparatus of claim 24 wherein the control system comprises:
- a first gating system, the first gating system being configured to open in response to the predetermined number of first or second electrical signals and being configured to remain open for a first limited period of time;
- a second gating system, the second gating system configured to open in response to an input from the first gating system and to remain open for a second limited period of time, the first gating system being configured to generate the input if the predetermined number of first or second electrical signals occur in the first limited period of time; and
- wherein the second gating system prevents first electrical signals from reaching the first processing system when the second gating system is closed, and enabling first electrical signals to reach the first processing system when the second gating system is open.

26. The apparatus of claim 25 further comprising a second processing system configured to record information regarding the second signals.

27. The apparatus of claim 25 further comprising a second processing system configured to:
- record information regarding the second signals; and
- calculate an energy of a $\gamma$-ray that generated the second signals.

28. The apparatus of claim 25 further comprising a second processing system configured to:
- record information regarding the second signals;
- calculate an energy of a $\gamma$-ray that generated the second signal; and
- estimate a type of radioactive atom present in the radioactive material from the calculated energy.

29. The apparatus of claim 25 wherein the first processing system is configured to record information regarding the first signals.

30. The apparatus of claim 25 wherein the first signals, when graphed as intensity vs. time, having a leading edge, a trailing edge, and a total area; the leading edge terminating at or before a peak intensity and the trailing edge initiating at or after the peak intensity; an initial intensity being defined as the sum of intensity underlying the leading edge; a final intensity being defined as the sum of intensity underlying the trailing edge; the first processing system being configured to:
- record information regarding the first signals; and
- process the recorded information to ascertain initial intensity and final intensity.

31. The apparatus of claim 25 wherein the first signals, when graphed as intensity vs. time, having a leading edge, a trailing edge, and a total area; the leading edge terminating at or before a peak intensity and the trailing edge initiating at or after the peak intensity; an initial intensity being defined as the sum of intensity underlying the leading edge; a final intensity being defined as the sum of intensity underlying the trailing edge; the first processing system being configured to:
- record information regarding the first signals;
- process the recorded information to ascertain initial intensity and final intensity;
- utilize the ascertained information to distinguish first signals due to $\gamma$-ray stimulation of the first set of the detectors from neutron stimulation of the first set of detectors.

32. The apparatus of claim 25 wherein the first signals, when graphed as intensity vs. time, having a leading edge, a trailing edge, and a total area; the leading edge terminating at or before a peak intensity and the trailing edge initiating at or after the peak intensity; an initial intensity being defined as the sum of intensity underlying the leading edge; a final intensity being defined as the sum of intensity underlying the trailing edge; the first processing system being configured to:
- record information regarding the first signals;
- process the recorded information to ascertain initial intensity and final intensity;
- utilize the ascertained information to distinguish first signals due to $\gamma$-ray stimulation of the first set of the detectors from neutron stimulation of the first set of detectors; and
- sum the total amount of neutron stimulation of the first set of detectors.

33. The apparatus of claim 25 wherein the first signals, when graphed as intensity vs. time, having a leading edge, a trailing edge, and a total area; the leading edge terminating at or before a peak intensity and the trailing edge initiating at or after the peak intensity; an initial intensity being defined as the sum of intensity underlying the leading edge; a final intensity being defined as the sum of intensity underlying the trailing edge; the first processing system being configured to:
- record information regarding the first signals;
- process the recorded information to ascertain initial intensity and final intensity;
- utilize the ascertained information to distinguish first signals due to y Pray stimulation of the first set of the detectors from neutron stimulation of the first set of detectors;
- sum the total amount of neutron stimulation of the first set of detectors; and
- convert the sum to an estimate of a total amount of radioactive material in the sample.

34. The apparatus of claim 25 wherein the predetermined number of first or second electrical signals is two.

35. The apparatus of claim 25 wherein the timing of the first and second gates is accomplished entirely by cable delay systems.

36. The apparatus of claim 25 wherein the first limited period of time is less than 10 nanoseconds.

37. The apparatus of claim 25 wherein the second limited period of time is less than 200 nanoseconds.

* * * * *